United States Patent

[11] 3,581,652

| [72] | Inventor | John A. Chauvin<br>1313 Jefferson, Gretna, La. 70053 |
|---|---|---|
| [21] | Appl. No. | 681,128 |
| [22] | Filed | Nov. 7, 1967 |
| [45] | Patented | June 1, 1971 |

[54] APPARATUS FOR PROCESSING SHRIMP
13 Claims, 5 Drawing Figs.

[52] U.S. Cl. .................................................. 99/334,
99/111, 99/349, 99/427, 99/443
[51] Int. Cl. .................................................. A47j 43/18,
A23c 25/08
[50] Field of Search ................................. 99/107,
111, 361, 362, 422, 423, 443, 443 C, 335, 334,
349, 427

[56] References Cited
UNITED STATES PATENTS
2,355,798   8/1944   Guthier ....................... 99/443

| 2,365,519 | 12/1944 | Bloedorn..................... | 99/188 |
| 2,807,550 | 9/1957 | Zarotschenzeff et al. .... | 99/443 |
| 3,256,803 | 6/1966 | Nelson ......................... | 99/443 |
| 2,540,036 | 1/1951 | Spencer....................... | 99/111 |

*Primary Examiner*—Raymond N. Jones
*Assistant Examiner*—Robert M. Elliott
*Attorney*—Beveridge & De Grandi ABSTRACT: Shrimp processing wherein two overlying endless conveyor belts receive shelled shrimp therebetween and convey them through a steam cooking zone. The upper conveyor belt is provided with weights for urging it downwardly into engagement with the shrimp to maintain the shrimp in substantially straight condition during cooking. The conveyors travel in synchronism with each other preferably at a speed which is variable in accordance with the temperature at the cooking zone. After leaving the cooking zone, the shrimp are conveyed through a cooling zone and then finally to a grading or other processing conveyor.

INVENTOR
JOHN A. CHAUVIN

Patented June 1, 1971

INVENTOR
JOHN A. CHAUVIN

BY Browne, Schuyler & Beveridge

ATTORNEYS

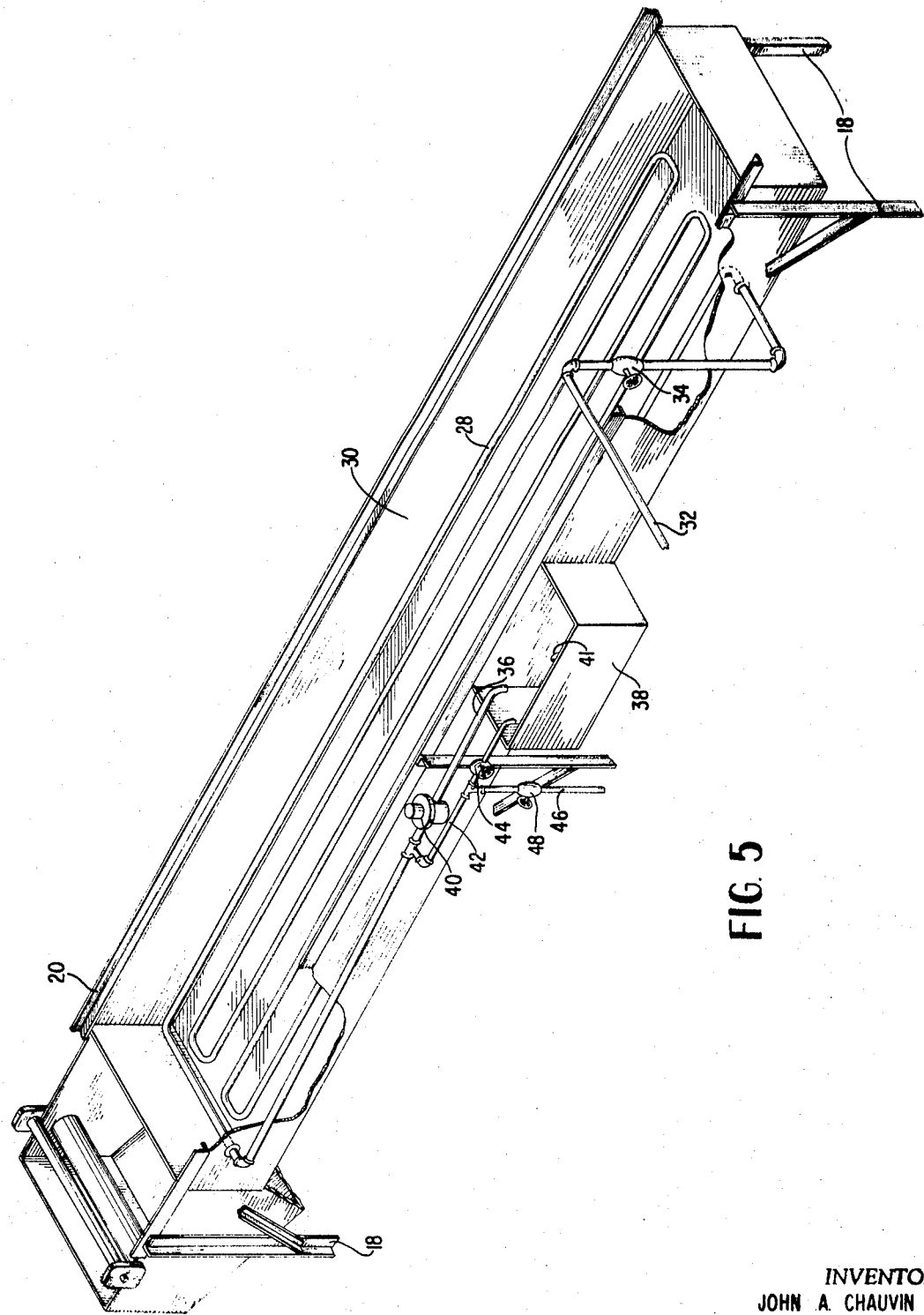

3,581,652

APPARATUS FOR PROCESSING SHRIMP

SUMMARY OF INVENTION

The present invention generally relates to method and apparatus for processing shrimp and is particularly concerned with cooking shelled shrimp.

One of the objects of the present invention is to provide a method and apparatus for cooking shelled shrimp while at the same time maintaining the shrimp in a generally straight or slightly curled condition as opposed to the well-known curled condition which heretofore has resulted with conventional methods and apparatus.

A further object of the present invention is to provide a method and apparatus which will produce high quality cooked shrimp from the standpoints of pigmentation, texture and flavor.

A still further object of the present invention is to provide such a method and apparatus which will achieve the above objects and yet are feasible to implement on a commercial basis.

In one embodiment, the above objects are achieved by apparatus including two overlying conveyor belts which receive shelled shrimp therebetween and move them through a steam zone for cooking. The upper conveyor belt is provided with weights which urge it downwardly to engage and press the shrimp against the underlying conveyor to insure that the shrimp will remain in substantially straight condition during the steaming operation. The steam for cooking is introduced in coils located in a tank underlying the lower conveyor belt. The steam rises and passes through apertures in the lower conveyor belt to cook the shrimp without excessive removal of moisture and while maintaining the proper pigmentation of the shrimp. The conveyor belts travel in synchronism and preferably their speed is made variable depending on the temperature at the cooking zone. To this end, a suitable temperature sensing device is placed at the cooking zone to control a variable speed drive gear assembly associated with the drive mechanism of the conveyor belts.

When the shrimp are cooked and reach the discharge ends of the conveyor belts, they fall through a chute on to a second conveyor which carries the shrimp through a cooling zone. Upon emergence from the cooling zone, the shrimp fall through another chute which deposits them on another conveyor for grading or further processing.

Other objects and advantages of the present invention will become apparent from the following more detailed description taken in conjunction with the associated drawings in which:

FIG. 5 is an enlarged, perspective view with portions broken away, of steam coils in a tank and other related apparatus employed in producing heat for cooking the shrimp.

DETAILED DESCRIPTION

Figure 1:
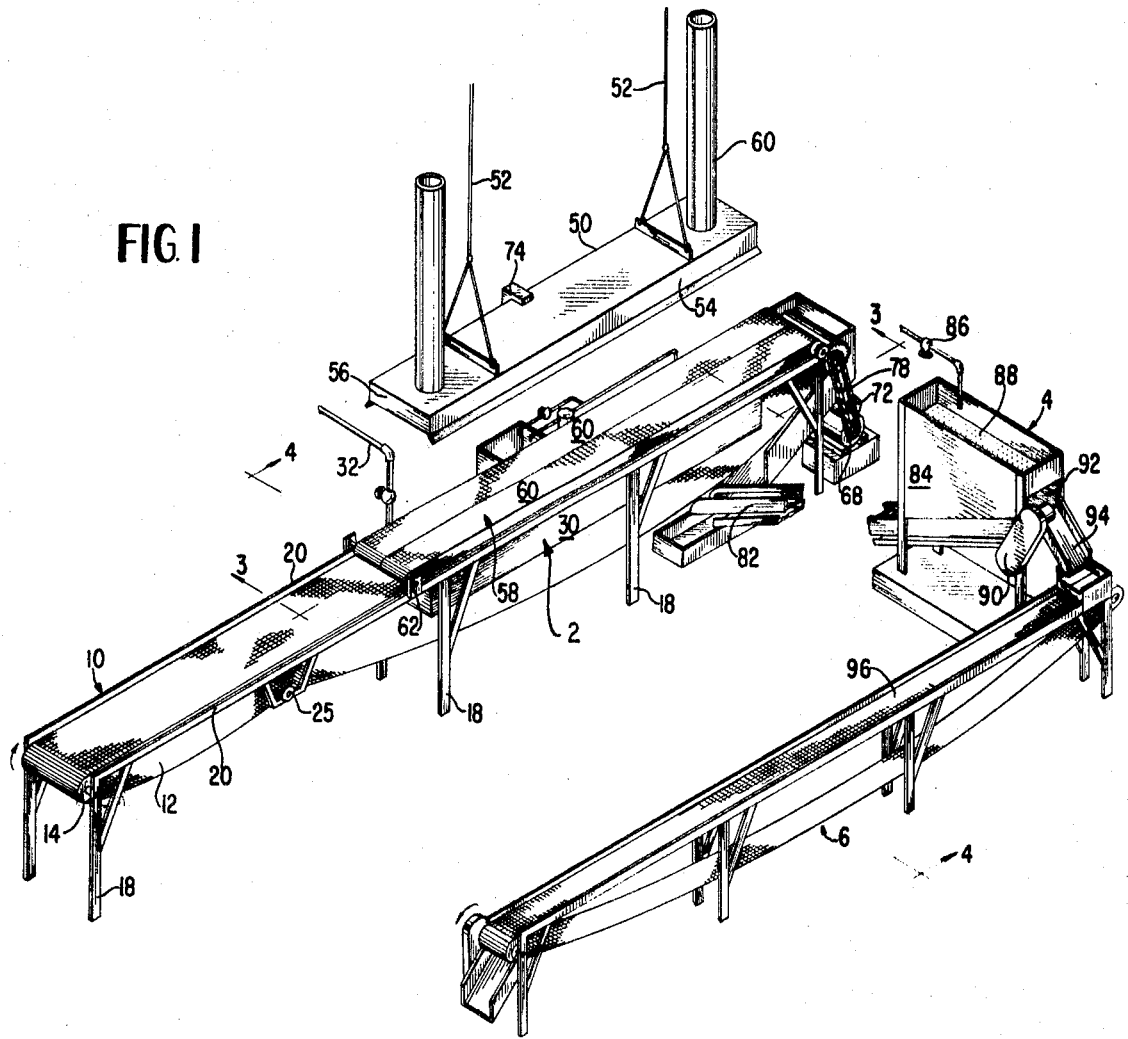
FIG. 1 is a perspective view of shrimp processing apparatus representing one embodiment of the present invention.

Referring now to the drawings in detail, the shown apparatus is employed to first cook shrimp at a cooking zone or station generally designated 2, after which the shrimp are conveyed through a cooling station generally designated 4 and finally to a grading station generally designated 6. Apparatus for conveying the shrimp through the cooking station includes a main belt conveyor generally designated 10 having an endless belt 12 formed of suitable material such as a woven stainless steel mesh which will permit heat to be transmitted through the belt into contact with the shrimp as will be further described. At its inlet end, belt 12 is trained about an idler sprocket 14 which at its discharge end, is received around a drive sprocket 16. The support frame for conveyor 10 includes vertical legs 18 between which extend elongated horizontal frame members which are shown as L-shaped structural steel angles 20. The upstanding arms of angles 20 are of sufficient dimension to project above the plane of conveyor belt 12 so as to act as a guide for the belt maintaining it in proper alignment. Extending between angles 20 are transverse bracing angles 22 while an elongated flat bracing member 24 extends longitudinally below the center line of the upper run of the conveyor belt, it being secured on transverse braces 22. In order to keep the lower run of the belt 12 in alignment as well as to reduce slack, a guide or idler roll 25 is suitably mounted from frame members 20 to extend transversely under the lower run of conveyor belt 12 as shown in FIG. 1.

At the cooking zone, shrimp are cooked by steam which is introduced in steam coils 28 received in an elongated main tank 30 directly underlying the discharge half of conveyor 10 as shown in FIGS. 1 and 5. Tank 30 is secured to the horizontal and vertical framing members of conveyor 10 in any suitable manner. The steam may be generated from any suitable source such as a boiler (not shown) and is introduced into coils 28 through inlet line 32 which has a shut-off valve 34. Steam coils 28 terminate in an exhaust line 36 feeding into a reserve water tank 38 which also serves to receive the steam "bleed off". Tank 38 is fixed against main tank 30, and a port 41 intercommunicates the tanks for purposes of equalizing their water levels. A steam trap 40 is provided in exhaust line 36 and a bypass line 42, which feeds into reserve tank 38, is connected to exhaust line 36 upstream of steam trap 40. Bypass line 42 has a bypass valve 44, and a cleanout line 46 including a shut-off valve 48 is connected in the bypass line 42 upstream of bypass valve 44 as shown in FIG. 5.

In order to provide a substantially closed cooking zone, a steam hood 50 is suspended by cables 52 above conveyor 10 to be in coextensive relationship with main tank 30. Hood cables 52 are suitably attached to a pulley or any other suitable mechanism (not shown) so that the hood may be moved between a raised, idle, position such as shown in FIG. 1 and a lowered, operative position in direct overlying relationship with the conveyor 10 and the main tank 30 wherein it will form a substantially closed cooking zone. The side and end walls 54 and 56 of the steam hood are formed so as to accommodate an upper conveyor generally designated 58 which extends over the main conveyor 10 for a purpose to be described shortly. When hood 50 is in the operative or lower position, steam is exhausted from the cooking zone through exhaust stacks 60 which project upwardly from the hood generally at its opposite ends.

In accordance with the invention, upper conveyor 58 is employed to engage the shrimp as they are conveyed through the cooking zone to maintain them in contact against main conveyor belt 12 in substantially straight condition and thereby prevent curling of the shrimp. Although conveyor 58 is shown with two belts 60 it will be appreciated that a single belt may be employed instead.

Belts 60 are identical and extend in coplanar side by side relationship over the second or discharge half of main conveyor belt 12 between idler and drive sprockets 62 and 64 which may be journaled for rotation such as in brackets 66 secured to frame angles 20. The spacing between the lower runs 61 of belts 60 and the upper run 13 of belt 12 is designed so that the shrimp will be engaged along its opposite back and bottom sides by the belts to prevent curling. Belts 12 and 60 are driven such that their upper and lower runs 13 and 16 respectively, move in the same direction at equal speed. The actual drive mechanism may include a main motor 68 connected by a chain 70 to drive sprocket 16 of main conveyor 10. Drive sprocket 16 is meshed with drive sprocket 64 of the upper conveyor 58 to drive the same in a counter direction which in turn will move conveyor belts 60 in the desired direction of the upper run 13 of belt 12 as indicated by the arrows in FIG. 3.

In the preferred embodiment, the speed of the belts is made variable in accordance with the temperature at the cooking zone. This may be achieved by any suitable variable drive gear assembly designated 72 operatively connected to motor 68 to vary its speed in response to a temperature sensing device 74 which may be mounted in steam hood 50 as indicated in FIG. 1. The variable drive assembly 72 may also be disconnected from the temperature sensing device to allow manual adjustment to accommodate different size shrimp or different food items.

Figure 2:
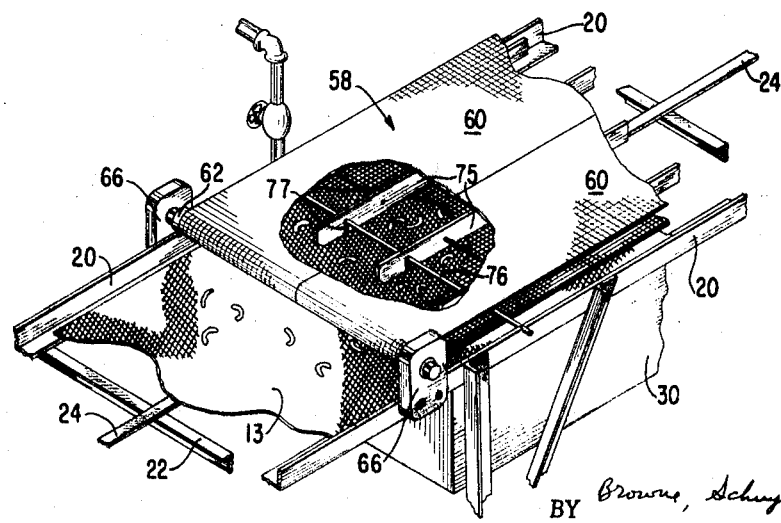
FIG. 2 is an enlarged, perspective view showing portions of overlying conveyor belts included in the apparatus of FIG. 1, the upper conveyor belt being partly broken away to show internal construction.
Figure 3:
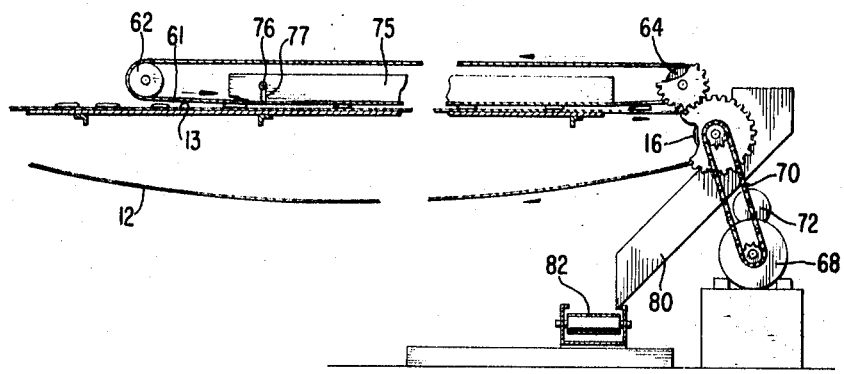
FIG. 3 is an elevational view of the upper conveyor belt and a portion of the underlying conveyor belt illustrating how they cooperate to hold the shrimp in generally straight condition during a cooking operation.
Figure 4:
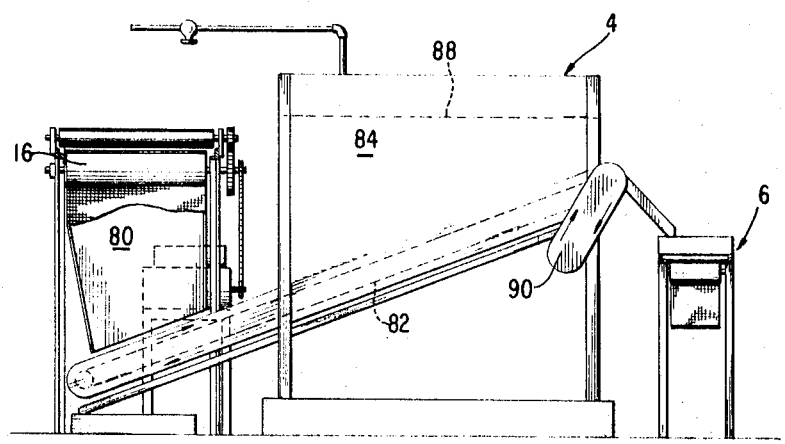
FIG. 4 is an elevational view taken generally along lines 4-4 of FIG. 1 and illustrating cooling apparatus and shrimp conveying chutes at the inlet and outlet sides thereof.

In order to insure that belt runs 61 are continuously urged downwardly into the desired engagement with the shrimp, weights are provided between the upper and lower runs of belts 60. In the specific form shown, the weights are provided by four elongated weight bars 75 which are transversely spaced across belts 60 and extend longitudinally generally through the full length of belt 60 but terminate short of sprockets 62 and 64 as shown in FIGS. 2 and 3. Weight bars 75 are supported on rods 76 which extend across the belt and are mounted in holes formed in frame angles 20. Elongated slots 77 formed in weight bars 75 receive rods 76 with the lower longitudinal edges of bars 75 continuously engaging the lower belt run 61 to urge it downwardly for proper engagement with the shrimp.

When the shrimp reach the discharge end of conveyors 10 and 58, they fall through a chute 80 leading to a conveyor 82 which carries the shrimp through a cooling chamber 84. In the shown embodiment, conveyor 82 inclines upwardly from its inlet and the cooling chamber is positioned over the upper end of the conveyor 82 so that a cooling fluid such as water from an inlet line 86 may be introduced on a top perforated plate 88 and drop downwardly into engagement with the shrimp to cool the same as desired. Conveyor 82 may be driven in any suitable manner such as through a motor and pulley arrangement generally designated 90. Cooling chamber 84 has an outlet opening 92 through which the shrimp pass after cooling, and then a chute 94 guides them downwardly into a conveyor 96 which may be employed for sorting or grading the shrimp or to convey the shrimp to another station for further processing. In addition to the described cooling chamber and fluid, other cooling agents such as cryogenic fluids including carbon dioxide may be employed to cool the shrimp if desired.

To summarize operation, the shrimp are initially placed on main conveyor belt 12 such as by hand and preferably with the backs of the shrimp facing upwardly. Main conveyor belt 12 then carries the shrimp to the cooking zone where the shrimp are engaged between conveyor belt runs 13 and 61 which move the shrimp through the cooking zone while maintaining them in a generally straight uncurled position. With steam hood 50 lowered into its operative position forming a substantially closed cooking chamber, the steam rising through the mesh of conveyor belt 12 cooks the shrimp to the desired temperature as the shrimp are being conveyed by belts 12 and 60. The temperature sensing device 74 senses the temperatures in the cooking chamber and controls the speed of conveyors 10 and 58 so that the shrimp will not be over or under cooked. After cooking, the shrimp are conveyed through cooling chamber 84 and subsequently to grading conveyor 96.

It will thus be seen that the present invention provides novel and improved apparatus for steaming large quantities of shelled shrimp while giving them the appearance of having been cooked in the shell by virtue of their generally straight condition. Additionally, it will be appreciated that the steaming of the shrimp is controlled so that high quality flavor and pigmentation are produced.

Modifications and adaptations of the present invention readily apparent from the foregoing description and associated drawings, although not specifically mentioned herein, will nevertheless be included within the scope of the present invention as indicated in the appended claims.

I claim:

1. Apparatus for processing shrimp comprising in combination; a shrimp conveyor including a movable support surface for receiving shrimp for movement through a cooking zone, and a pressure applying means movable over said support surface in the same direction as and in synchronism with said support surface for applying pressure on the shrimp to maintain them against said support surface in generally straight condition as they are being cooked, said pressure applying means including a second conveyor having an endless belt engageable with the backs of shrimp as they are conveyed through the cooking zone by said first conveyor, said endless belt having upper and lower runs and weight means extending longitudinally between the runs in engagement with the lower run to urge the same downwardly into engagement with shrimp.

2. Apparatus defined in claim 1 further including means for supporting said weight means including a plurality of cross-members extending transversely of the belt between the upper and lower runs thereof with said weight means being supported on said cross-members.

3. Apparatus defined in claim 2 wherein said weight means have downwardly facing apertures facing the lower run of the belt receiving said cross-members.

4. Apparatus defined in claim 3 wherein said weight means are elongated bars.

5. Apparatus defined in claim 1 further including means for introducing steam in the cooking zone whereby the shrimp are cooked by steaming.

6. Apparatus defined in claim 5 further including; a cooling zone located at the discharge end of said first conveyor, and a second conveyor for conveying shrimp through the cooling zone after the shrimp leave the cooking zone.

7. Apparatus defined in claim 6 wherein said cooling zone includes a cooling chamber having an inlet opening and an outlet opening through which said second conveyor extends for conveying shrimp through the cooling chamber, said cooling chamber including a perforated top wall and an enclosure around said top wall for permitting a cooling medium to be introduced into said cooling chamber into contact with shrimp for cooling.

8. Apparatus defined in claim 6 further including a third conveyor positioned to receive shrimp from said second conveyor and to convey the shrimp to a further processing station.

9. Apparatus defined in claim 5 wherein said means for introducing steam is located solely below said support surface, and said support surface is apertured to facilitate steam contact with the shrimp.

10. Apparatus defined in claim 9 further including enclosure means defining the cooking zone, said enclosure means including a hood movable above the support surface between an operative position closely overlying the support surface and an idle position retracted away from the support surface.

11. Apparatus for processing shrimp comprising in combination; a shrimp conveyor including a movable support surface for receiving shrimp for movement through a cooking zone, and a pressure applying means movable over said support surface in the same direction as and in synchronism with said support surface for applying pressure on the shrimp to maintain them against said support surface in generally straight condition as they are being cooked, means for introducing steam in the cooking zone whereby the shrimp are cooked by steaming, means for varying the speed of said conveyor and means responsive to the temperature at the cooking zone for controlling said means for varying the speed of the conveyor in accordance with the temperature at the cooking zone.

12. Apparatus for cooking food such as shrimp comprising in combination; a conveyor means including an apertured support surface movable in a generally horizontal plane for receiving shrimp thereon for movement through a cooking zone, pressure applying means movable over said support surface in the same direction as and in synchronism with said support surface for applying pressure on the shrimp to maintain them against said support surface in generally straight condition as they are being cooked, said pressure applying means including a second conveyor having an endless belt engageable with the backs of the shrimp as they are conveyed through the cooking zone by said first conveyor, and means for producing steam for cooking shrimp while on the support surface of said conveyor means including an elongated tank located in alignment below said support surface, said tank having an open top facing said conveyor means and a plurality of elongated steam coils located in said tank and extending longitudinally thereof below said conveyor for emitting steam to pass upwardly through the conveyor support surface into contact with the shrimp thereon for cooking the same.

13. Apparatus defined in claim 12 further including means defining a cooking chamber aligned above said conveyor support surface and said tank.